(12) United States Patent
Chodyla

(10) Patent No.: US 9,220,189 B2
(45) Date of Patent: Dec. 29, 2015

(54) ROOTING TAPE

(75) Inventor: Bernard Chodyla, Tallahassee, FL (US)

(73) Assignee: Rootingtape B.V., 's-Gravenzande (NL)

( * ) Notice: Subject to any disclaimer, the term of this patent is extended or adjusted under 35 U.S.C. 154(b) by 360 days.

(21) Appl. No.: 13/556,765

(22) Filed: Jul. 24, 2012

(65) Prior Publication Data

US 2013/0192133 A1 Aug. 1, 2013

Related U.S. Application Data

(60) Provisional application No. 61/511,212, filed on Jul. 25, 2011.

(51) Int. Cl.
*A01C 1/04* (2006.01)
*A01G 9/10* (2006.01)

(52) U.S. Cl.
CPC ............. *A01C 1/044* (2013.01); *A01G 9/104* (2013.01)

(58) Field of Classification Search
CPC ................................. A01G 9/104; A01C 1/044
USPC ........... 47/56, 65.7, 65.8, 77; 248/690, 205.2; 24/442, 452; 119/170; 203/423
See application file for complete search history.

(56) References Cited

U.S. PATENT DOCUMENTS

| | | | |
|---|---|---|---|
| 635,170 A * | 10/1899 | Martin, Jr. ...................... 281/29 |
| 3,328,916 A * | 7/1967 | Haruto Okita et al. ........... 47/56 |
| 3,917,276 A * | 11/1975 | Green Barg .................... 273/139 |
| 4,369,599 A | 1/1983 | Franclet et al. |
| 4,866,879 A * | 9/1989 | Wood et al. ........................ 47/56 |
| 4,917,240 A * | 4/1990 | Roberts et al. ................. 206/232 |
| 4,972,627 A | 11/1990 | Hori et al. |
| 5,408,782 A * | 4/1995 | McConnell .................... 182/187 |
| 5,758,772 A * | 6/1998 | Weder et al. ................... 206/423 |
| 5,930,876 A * | 8/1999 | Takizawa et al. ............... 24/452 |
| 6,240,674 B1 * | 6/2001 | Otake et al. ........................ 47/56 |
| 6,735,902 B1 * | 5/2004 | Ahm ................................. 47/56 |
| 7,356,964 B2 * | 4/2008 | Ahm ................................. 47/56 |
| 2005/0101926 A1 * | 5/2005 | Ausen et al. .................. 604/358 |
| 2005/0273987 A1 * | 12/2005 | Honchel ......................... 24/442 |
| 2008/0072488 A1 | 3/2008 | Fujita |
| 2009/0107040 A1 * | 4/2009 | Vandenhove .................. 47/65.7 |
| 2010/0199467 A1 * | 8/2010 | Morejon ......................... 24/442 |
| 2011/0091682 A1 * | 4/2011 | Holland et al. ............... 428/100 |
| 2012/0096689 A1 * | 4/2012 | Lampignano ................... 24/442 |

FOREIGN PATENT DOCUMENTS

| | | | | |
|---|---|---|---|---|
| DE | 2059748 A1 | 6/1972 | | |
| EP | 0322179 A1 | 6/1989 | | |
| GB | 2197774 A * | 6/1988 | ............. | A01C 1/04 |
| GB | 2471721 A | 1/2011 | | |
| WO | 0000007 A1 | 1/2000 | | |
| WO | 2010042960 A1 | 4/2010 | | |

* cited by examiner

*Primary Examiner* — Rob Swiatek
*Assistant Examiner* — Morgan T Barlow
(74) *Attorney, Agent, or Firm* — The Webb Law Firm

(57) ABSTRACT

A soilless rooting system-which includes an elongated holder having a first portion and a second portion extending the length of the holder. The first and second portions include a material that permits roots from a vegetative cutting to grow-therethrough. The use of the rooting system, a method of rooting of vegetative cuttings, and an assembly including a rooting system and plant material are also disclosed.

12 Claims, 5 Drawing Sheets

ROOTING TAPE

CROSS-REFERENCE TO RELATED APPLICATION

This application claims priority to U.S. Provisional Application No. 61/511,212, filed Jul. 25, 2012, herein incorporated by reference in its entirety.

FIELD OF THE INVENTION

The present invention relates to a rooting system and the use of said rooting system. The invention further relates to a method of rooting of vegetative cuttings. The invention also relates to an assembly comprising said rooting system a plant material.

BACKGROUND OF THE INVENTION

Plant material is commonly reproduced via vegetative cuttings. Such vegetative cuttings are often a cutting of about 5 cm in length of a portion of a mother plant, which may include one or more leaves. The unrooted cutting is typically inserted in a growth media such as a growth cell or "plug" containing growth media and nutrients until roots are formed. The rooted cutting in the growth cell, often termed a liner, is then distributed to a plant grower. The liner is then transplanted into a container and grown until the plant achieves a growth stage suitable for distribution in the marketplace. Such growth cells or plugs often contain soil or a soil replacement. The disadvantage of soil or soil replacement is that these are often prohibited from being imported into countries. Soilless media are desirable for their ability to be imported from one country to another. Further downsides are that soil and soil replacements are heavy, especially if kept wet, and take up a relative large amount of space which are both disadvantageous for transport.

SUMMARY OF THE INVENTION

It is an object of the present invention to provide for an improved growing medium.

It is further an object of the present invention to provide for a growth medium overcoming the disadvantages of the growth media according to the prior art.

The present inventor has surprisingly found that the above objects are met by a soilless rooting system comprising: an elongated holder having a first portion and a second portion extending the length of the holder, said first and second portions comprising a material that permits roots from a vegetative cutting to grow therethrough.

The present invention is directed to a soilless rooting system that includes an elongated holder having a first portion and a second portion that extends to the length of the holder. The first and second portions include a material that permits roots from a vegetative cutting to grow therethrough. The present invention also includes a method of rooting vegetative cuttings by providing the rooting system and placing the vegetative cutting adjacent one of the first and second portions. The first and second portions are adhered together, thereby sandwiching the vegetative cutting therebetween.

The present invention includes a rooting system for germinating seeds or for producing a callus and/or roots of a vegetative cutting, and may be used to package, store, and transport the same. The present invention further relates to the use of said rooting system in growing plant material. The present invention is described in relation to the production of rooted cuttings from unrooted cuttings, but this is not meant to be limiting. For example, the present invention may also be used with tissue culture, bare root cuttings, or seeds. Thus, reference to rooting is also applicable to germinating. In addition, the present invention is not limited to use with any particular species of plants or crops, any ornamental and/or agricultural species may be used.

The present invention relates to a soilless rooting system comprising: an elongated holder having a first portion and a second portion extending the length of the holder, said first and second portions comprising a material that permits roots from a vegetative cutting to grow therethrough.

The present invention further relates to a use of an elongated holder having a first portion and a second portion extending the length of the holder, said first and second portions comprising a material that permits roots from a vegetative cutting to grow therethrough as a soilless rooting system.

In an embodiment of the present invention said first and second portions are joined by a web.

In an embodiment of the present invention said web comprises a liner onto which said first and second portions are received.

In an embodiment of the present invention said first portion comprises hooks and said second portion comprises loops for engagement by said hooks, preferably said first portion further comprises loops and/or said second portion further comprises hooks.

In an embodiment of the present invention said holder comprises a biodegradable material.

In an embodiment of the present invention said holder is folded along said web.

In an embodiment of the present invention said holder is weakened at intervals along the length of said holder for division of said holder into individual holders.

In an embodiment of the present invention said weakened intervals are spaced apart distances such that a vegetative cutting is positioned between adjacent weakened intervals.

In an embodiment of the present invention the elongated holder further comprises one or more plant growing agents, nutrients and/or one or more pesticides.

The present invention further relates to a method of rooting vegetative cuttings comprising the steps of: providing the rooting system according to the present invention; placing a vegetative cutting adjacent at least one of said first and second portions; and adhering the first and second portions together, thereby sandwiching the vegetative cutting there between.

In an embodiment of the present invention the method further comprises placing the rooting system with cuttings therein in a moist environment to allow roots to grow.

In an embodiment of the present invention the roots grow through at least one of the first and second portions.

In an embodiment of the present invention the method further comprises folding the rooting system along its length to sandwich the vegetative cuttings between the first and second portions.

In an embodiment of the present invention the method further comprises dividing the holder between the vegetative cuttings to create individual rooted cutting holders.

In an embodiment of the present invention the method further comprises inserting the rooting system with vegetative cuttings received therein into a protective sleeve.

In an embodiment of the present invention the method further comprises providing the individual rooted cutting holders to a pot.

The present invention further relates to an assembly comprising a system according to the present invention and a plant material such as a vegetative cutting or a seed.

DESCRIPTION OF THE DRAWINGS

The present invention is illustrated in more detail in the following description and with reference to the drawings, in which.

DESCRIPTION OF THE INVENTION

Figure 1:
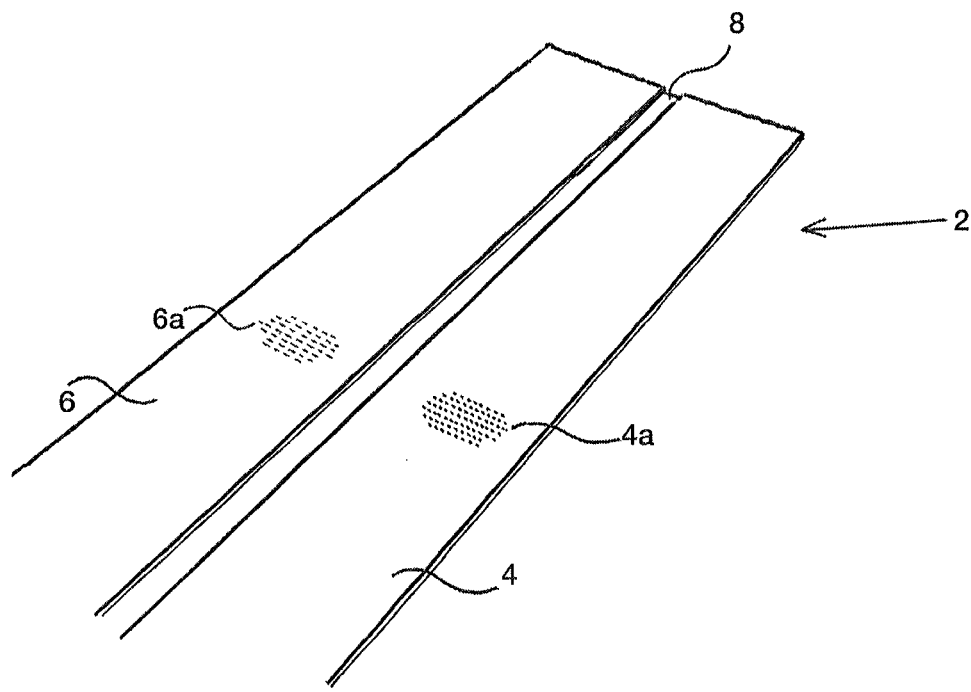
FIG. 1 is plan view of the rooting system of the present invention.
Figure 2:
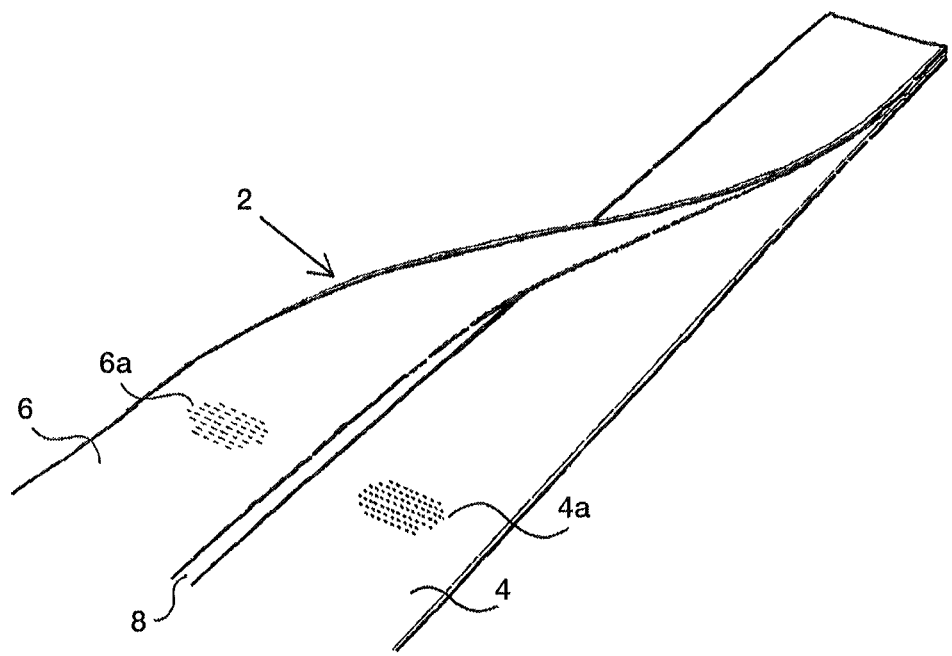
FIG. 2 is a perspective view of the rooting system of the present invention in a partially folded state.

As shown in FIGS. 1 and 2, the rooting system includes an elongated holder 2 having a first portion 4 and a second portion 6 that extend the length of the holder 2. The first and second portions 4, 6 are joined together via a liner or web 8. The web 8 may be sized to receive the entireties of the first and second portions 4, 6 thereon as shown. Alternatively, the web 8 may link first and second portions 4, 6 by only partially overlapping therewith. In yet another embodiment, first and second portions 4 and 6 are produced as one unitary structure, obviating the need for a web. Other variations of first and second portions 4, 6 with or without web 8, may be provided.

In one embodiment, the holder 2 is folded longitudinally along the web 8 between first and second portions 4, 6 as shown in FIG. 2, such that the first and second portions 4, 6 engage each other. The first portion 4 may include hooks 4a and the second portion 6 may include loops 6a (such as when using the commercial product Velcro®) so the first and second portions 4, 6 remain engaged. In a further embodiment portions 4 and 6 may each include hooks and loops.

Figure 3:
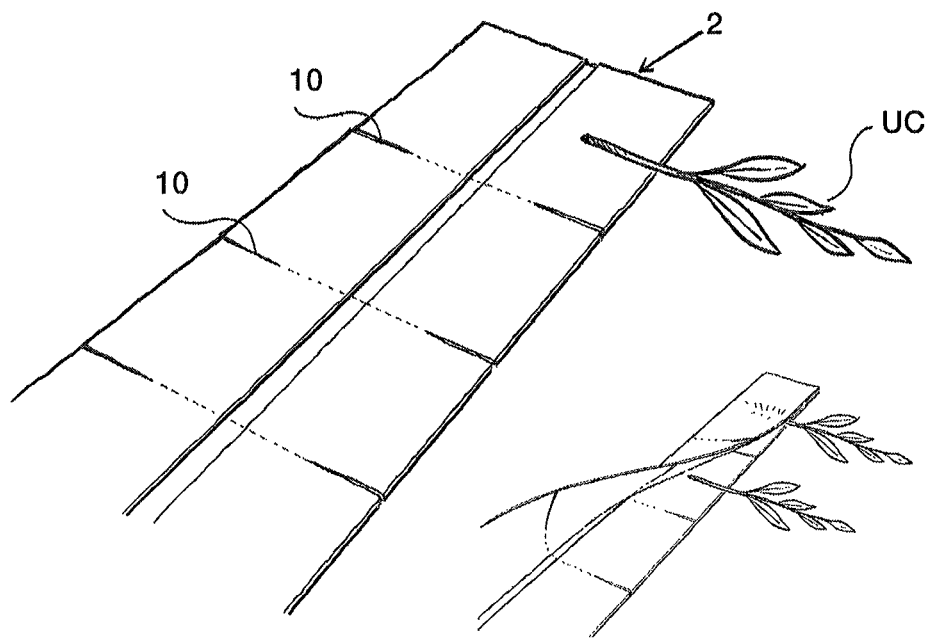
FIG. 3 is a plan view of the rooting system of the present invention with one portion separated therefrom and an unrooted cutting lying adjacent a portion thereof.
Figure 4:
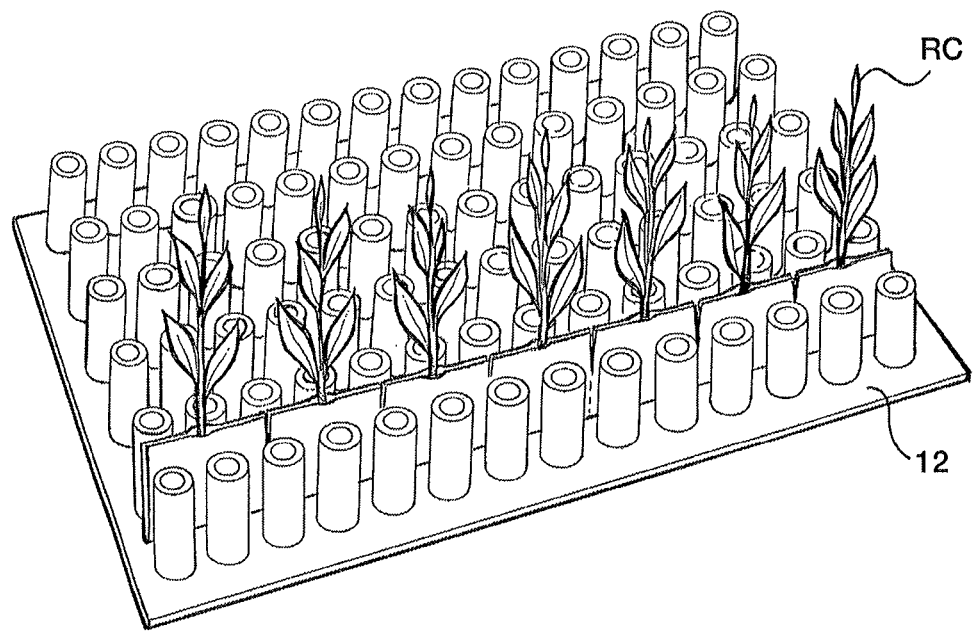
FIG. 4 is a perspective view of the rooting system of the present invention including rooted cuttings.
Figure 5:
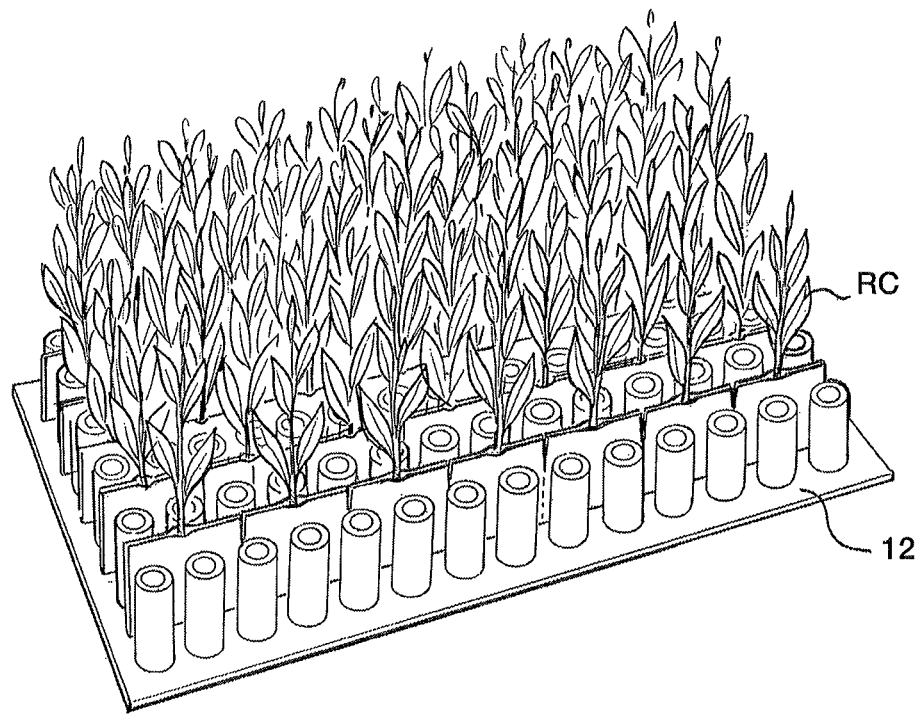
FIG. 5 is a plan view of the rooted cuttings shown in FIG. 4.
Figure 6:
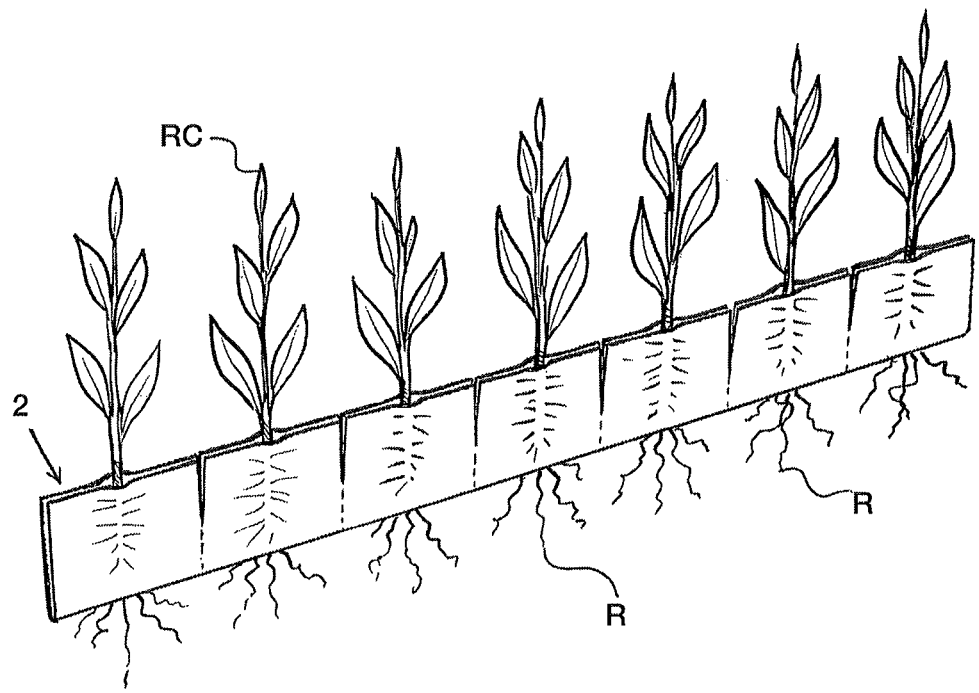
FIG. 6 is a side view of the rooting system of the present invention with rooted cuttings having roots growing through a lower portion thereof.

As the elongated holder 2 is folded, an unrooted cutting UC is inserted therebetween, as shown in FIG. 3. The elongated holder 2 may be of varying lengths. As shown in FIGS. 4 and 5, the holder 2 may be of a sufficient length to include a plurality of =rooted cuttings UC, each spaced apart a sufficient distance in order to allow the unrooted cutting UC to develop roots. In one embodiment, the elongated holder 2 includes weakened portions 10, such as a plurality of perforations provided transverse to the longitudinal axis of the holder 2, at intervals which may be regular intervals. See FIG. 3. An unrooted cutting UC is inserted into the elongated holder 2 between a pair of the weakened portions 10, with the first and second portions 4, 6 engaging one another. The holder 2, retaining at least one unrooted cutting UC, is placed in an environment suitable for rooting, such as with proper levels of moisture and/or light until roots form in a rooted cutting RC.

Figure 7:
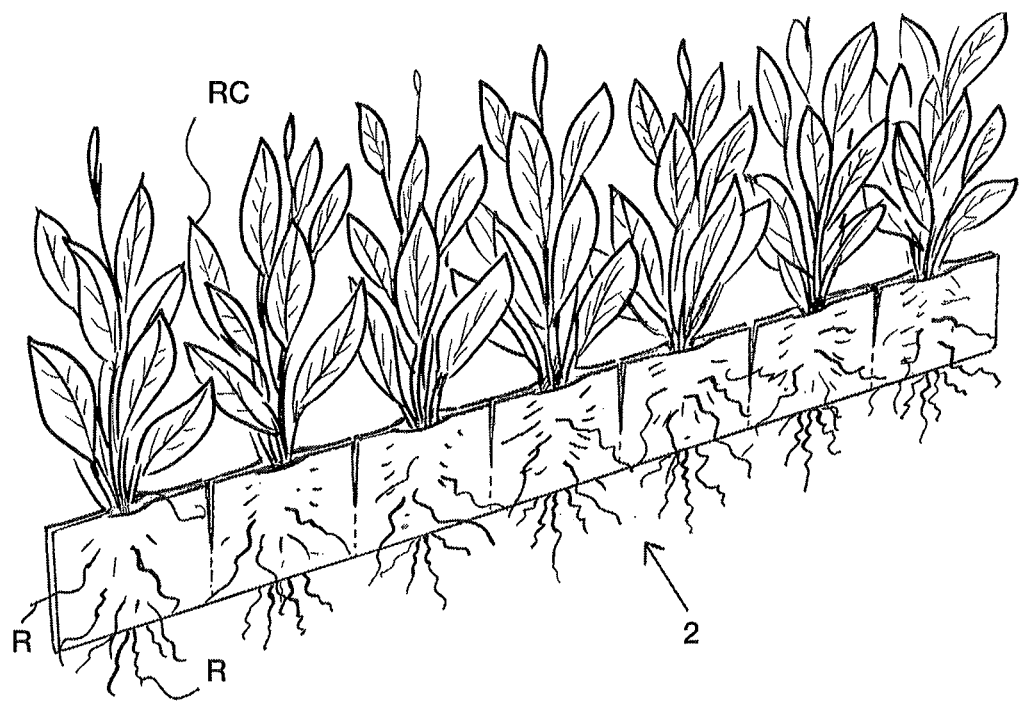
FIG. 7 is a side view of the rooting system of the present invention with rooted cuttings having roots extending through side portions thereof.
Figure 8:
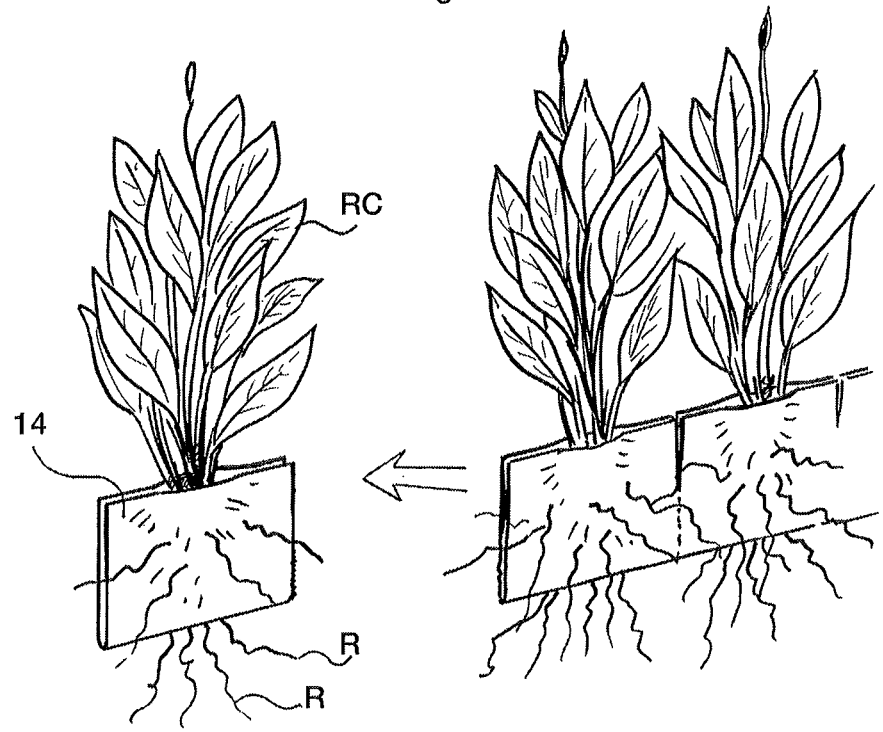
FIG. 8 is a side view of the rooting system of the present invention separated into an individual holder.
Figure 9:
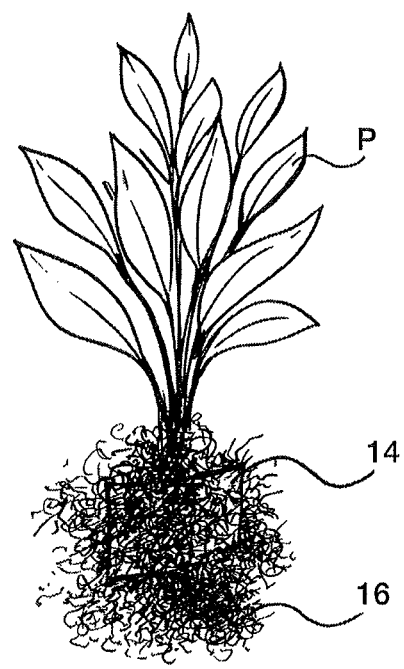
FIG. 9 is a side view of a rooted cutting such as shown in FIG. 8 after use in a pot with soil.

For some unrooted cuttings, it may be beneficial to support the holder 2 such that any leaves of the unrooted cuttings UC are free, with the roots able to grow in an opposite direction. For example, as shown in FIGS. 4 and 5, the elongated holder 2 containing rooted cuttings RC can be supported by a variety of means, including, in one non-limiting embodiment, a plug tray 12 which has been turned upside down such that the elongated holder 2 seats and is supported by the backside of the tray 12. After sufficient rooting has been completed, the elongated holder 2 with rooted cuttings RC is ready for transport, as shown in FIG. 7. Roots R of the rooted cutting RC extend through the material of the elongated holder 2. The elongated holder 2 may be divided along the weakened portions 10 to yield in a single rooted cutting RC supported by an individual holder 14, as shown in FIG. 8. The rooted cutting RC in an individual holder 14 is placed into a pot (not shown) containing soil and allowed to grow. The individual holder 14 does not interfere with growth of the plant and the roots R engage soil 16 as the rooted cutting RC grows into a plant P, as shown in FIG. 9.

Figure 10:
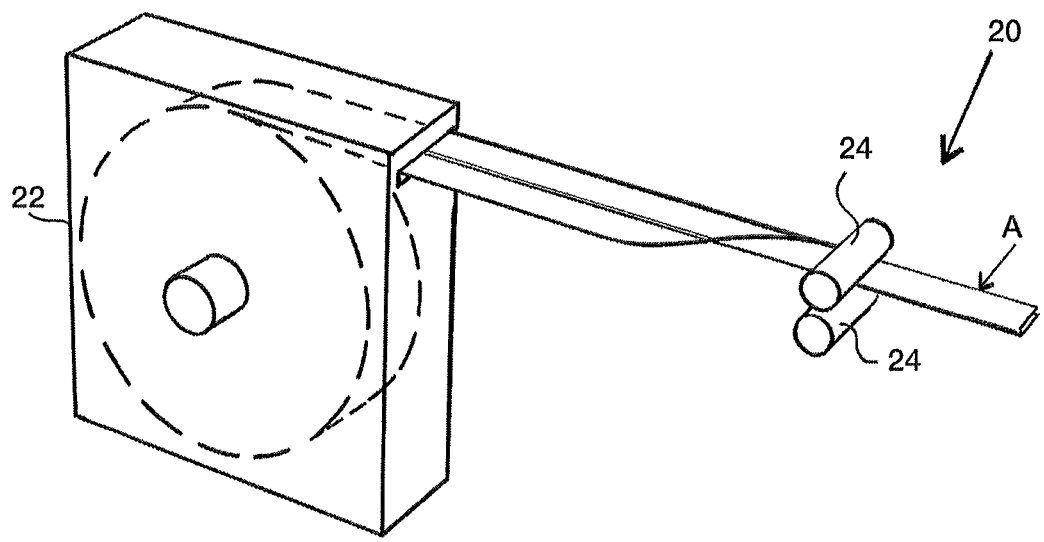
FIG. 10 is a schematic of a dispenser of the rooting system of the present invention.

The process of sticking the unrooted cuttings UC into the rooting system may be automated using a dispensing system 20, as shown schematically in FIG. 10. In one embodiment, the dispensing system 20 includes a roll dispenser 22 from which a length of the elongated holder 2 is removed in a flat state, such as shown in FIG. 1. The elongated holder 2 travels past a pair of opposing rollers 24, which urge the elongated holder 2 to fold upon itself along web 8. As the folded elongated holder 2 travels away from the dispenser 22, an unrooted cutting UC may be stuck into the locations between the weakened portions 10 in a relatively rapid fashion, as at arrow A.

The embodiment disclosed above considers the use of a one-piece elongated holder 2 having a first portion 4 and a second portion 6, and a web or liner 8 that supports the first and second portions 4, 6. However, the first and second portions may be separate components that are adhered together after the unrooted cuttings are inserted therebetween. In addition, the first and second portions may be held together by any mechanism, such as organic or inorganic glue, adhesive, heat fusion, staples, zippers, zip locks, or the like. Alternatively, one portion may be positioned on top of the other portion with the plant material placed in between for rooting. In this embodiment, an unrooted cutting may be placed onto one portion, allowed to root, and the second portion is laid thereover after rooting occurs. Alternatively, the elongated holder 2 may be a unitary structure with openings provided therein for insertion of the unrooted cuttings UC. Upon rooting, the roots grow out through both portions, such that the rooted cutting binds the two portions together.

The elongated holder 2 may be produced from inorganic or synthetic materials so that the rooted cuttings RC may be transported between countries that do not permit importation of organic rooting material, such as soil and bark. For example, the elongated holder 2 may be a synthetic material, such as polyester, nylon, or polyethylene terephthalate (e.g., fleece), and may be woven or non-woven. In one embodiment, the elongated holder 2 may be biodegradable, such as paper or other cellulosic material. In addition, the elongated holder 2 may be provided of any length, width, thickness, color, texture, scent, or shape that allows the plant material to develop roots and sustain the roots until transplanted into a growth media or soil. The elongated holder 2 should have a porosity that allows the unrooted cutting UC to grow roots R therethrough and be sufficiently permeable to water so that the cuttings UC or RC may be watered. In one embodiment, the cuttings UC or RC are treated with water containing optionally 50 ppm nitrogen, such as in the form of calcium nitrate. The soilless rooting system containing cuttings UC or RC may also be misted to maintain moisture in the rooting system.

After rooting has been accomplished, the rooted cuttings are suitable for transplanting. The rooted cuttings may be inserted into a transport device, such as an elongated plastic sleeve (not shown), which may be perforated to allow air flow. Sleeves containing holders with the rooted cuttings can then be packed into containers, such as cardboard boxes, with ice packs.

In an embodiment the elongated holder 2 is provided with information, preferably in the form of a bar code, quick response (QR) code or an information carrier such as an Radio-frequency identification (RFID) tag.

It will be readily appreciated by those skilled in the art that modifications may be made to the invention without departing from the concepts disclosed in the foregoing description. Accordingly, the particular embodiments described in detail herein are illustrative only and are not limiting to the scope of the invention, which is to be given the full breadth of the appended claims and any and all equivalents thereof. The appended claims also form part of the description.

The invention claimed is:

1. A soilless rooting system comprising:
   an elongated holder having a first portion and a second portion extending a length of the holder, said first and second portions being joined by a web, said web having a different thickness than each of said first and second portions, and said first and second portions comprising a material that permits roots from a vegetative cutting to grow therethrough;
   wherein said holder is folded along said web;
   wherein said holder is weakened at intervals along the length of said holder for division of said holder into individual holders; and
   wherein said weakened intervals are spaced apart distances such that a vegetative cutting is positioned between adjacent weakened intervals.

2. The system according to claim 1, wherein said web comprises a liner onto which said first and second portions are received.

3. The system according to claim 1, wherein one of said first and second portions comprises hooks and the other of said first and second portions comprises loops for engagement by said hooks.

4. The system according to claim 1, wherein said holder comprises a biodegradable material.

5. The system according to claim 1 wherein the elongated holder further comprises one or more plant growing agents, nutrients, or pesticides.

6. A method of rooting vegetative cuttings comprising:
   providing a rooting system comprising an elongated holder having a first portion and a second portion extending a length of the holder, said first and second portions being joined by a web, said web having a different thickness than each of said first and second portions, said first and second portions comprising a material that permits roots from a vegetative cutting to grow therethrough;
   placing the vegetative cutting adjacent at least one of said first and second portions; and
   adhering the first and second portions together, thereby sandwiching the vegetative cutting therebetween.

7. The method of claim 6, further comprising placing the rooting system with cuttings therein in a moist environment to allow roots to grow.

8. The method of claim 7, wherein the roots grow through at least one of the first and second portions.

9. The method of claim 8, further comprising folding the rooting system along its length to sandwich the vegetative cuttings between the first and second portions.

10. The method of claim 9, further comprising dividing the holder between the vegetative cuttings to create individual rooted cutting holders.

11. The method of claim 10, further comprising placing the individual rooted cutting holders into a pot.

12. The method of claim 6, further comprising inserting the rooting system with vegetative cuttings received therein into a protective sleeve.

\* \* \* \* \*